United States Patent
Huang et al.

(10) Patent No.: US 12,320,047 B2
(45) Date of Patent: Jun. 3, 2025

(54) MELTBLOWN NONWOVENS HAVING HIGH VOLUME RESISTIVITY AND ARTICLES THEREOF

(71) Applicant: Dow Global Technologies LLC, Midland, MI (US)

(72) Inventors: Xin Huang, Shanghai (CN); Yunfeng Yang, Shanghai (CN); Shijie Ren, Shanghai (CN); Yijian Lin, Pearland, TX (US); Haiyang Yu, Shanghai (CN); Jingya Li, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 114 days.

(21) Appl. No.: 18/040,860

(22) PCT Filed: Aug. 21, 2020

(86) PCT No.: PCT/CN2020/110449
§ 371 (c)(1),
(2) Date: Feb. 7, 2023

(87) PCT Pub. No.: WO2022/036672
PCT Pub. Date: Feb. 24, 2022

(65) Prior Publication Data
US 2023/0257920 A1     Aug. 17, 2023

(51) Int. Cl.
| | | |
|---|---|---|
| *B32B 41/00* | (2006.01) | |
| *B01D 39/16* | (2006.01) | |
| *D04H 3/018* | (2012.01) | |
| *D04H 3/147* | (2012.01) | |
| *D04H 3/16* | (2006.01) | |

(52) U.S. Cl.
CPC ........... *D04H 3/16* (2013.01); *B01D 39/1623* (2013.01); *D04H 3/018* (2013.01); *D04H 3/147* (2013.01); *B01D 2239/0622* (2013.01); *B01D 2239/1233* (2013.01)

(58) Field of Classification Search
CPC .......... D04H 3/16; D04H 3/018; D04H 3/147; D04H 1/4291; D04H 1/56; D04H 3/007; B01D 39/1623; B01D 2239/0622; B01D 2239/1233; B01D 2239/0233; B01D 2239/0407; B01D 2239/0627; B01D 2239/1241; B01D 39/163

USPC ............... 156/60, 64, 350, 351, 378, 379
See application file for complete search history.

(56) References Cited

U.S. PATENT DOCUMENTS

| | | | |
|---|---|---|---|
| 8,372,931 B2 | 2/2013 | Hermel-Davidock et al. | |
| 8,907,030 B2 | 12/2014 | Demirors et al. | |
| 9,959,951 B2 | 5/2018 | Person et al. | |
| 2006/0057379 A1* | 3/2006 | Inagaki ............... | D04H 1/4358 442/361 |
| 2008/0022642 A1* | 1/2008 | Fox ...................... | D04H 3/005 55/528 |
| 2010/0310837 A1* | 12/2010 | Bond .................... | D04H 3/16 442/337 |
| 2011/0003524 A1 | 1/2011 | Claasen et al. | |
| 2012/0123374 A1 | 5/2012 | Richeson et al. | |
| 2013/0190465 A1 | 7/2013 | Demirors et al. | |
| 2014/0248811 A1 | 9/2014 | Degroot et al. | |
| 2014/0248816 A1 | 9/2014 | Bonavoglia et al. | |
| 2020/0002849 A1 | 1/2020 | Shah et al. | |
| 2020/0005753 A1* | 1/2020 | Hattori ................ | B32B 29/005 |

FOREIGN PATENT DOCUMENTS

| | | | |
|---|---|---|---|
| CN | 106861287 A | 6/2017 | |
| CN | 107227555 | 10/2017 | |
| CN | 109603303 | 4/2019 | |
| JP | 11319440 | 11/1999 | |
| WO | WO-2018169738 A1 * | 9/2018 | ............... C08F 2/06 |

OTHER PUBLICATIONS

Monrabal, "Crystallization Elution Fractionation. A New Seaparation Process for Polyolefin Resins", Macromol. Symp., 2007, vol. 257, pp. 71-79.
Williams, "The Construction of a Polyethylene Calibration Curve for Gel Permeation Chromatography Using Plystyrene Fractions", J. Polym. Sci., Polym. Letters, 1968, vol. 6, p. 621.

* cited by examiner

*Primary Examiner* — Michael N Orlando
*Assistant Examiner* — Joshel Rivera
(74) *Attorney, Agent, or Firm* — Boyle Fredrickson S.C.

(57) ABSTRACT

Provided are meltblown nonwovens, and articles thereof. The meltblown nonwovens can be formed form a composition comprising an ethylene/alpha-olefin interpolymer and specific additive. The meltblown nonwovens according to embodiments disclosed herein exhibit a high volume resistivity and can be used in filtration applications.

11 Claims, No Drawings

MELTBLOWN NONWOVENS HAVING HIGH VOLUME RESISTIVITY AND ARTICLES THEREOF

TECHNICAL FIELD

Embodiments of the present disclosure generally relate to meltblown nonwovens, and more particularly relate to meltblown nonwovens formed from compositions having high volume resistivity.

INTRODUCTION

Electrical properties, such as volume resistivity and charge retention, are critical to filtration as they can help improve electrochemical degradation resistance and reduce electrical charge decay. Articles used for filtration purposes include meltblown nonwovens. Meltblown nonwovens that are formed from polypropylene as opposed to polyethylene are widely used in filtration applications because, among other things, polypropylene exhibits better electrical properties for filtration than polyethylene. For example, a typical meltblown nonwoven fabric formed from polypropylene compositions can be charged to obtain a static charge for dust collection. While polypropylene is the most popular polyolefin matrix for use in filtration applications, it has several drawbacks in comparison to polyethylene. For instance, polypropylene is rigid, not capable of being disinfected via radiation, and can degrade and become odorous. Accordingly, there remains a need for meltblown nonwovens formed from polyethylene that can be soft and less odorous and can exhibit good electrical properties, such as high volume resistivity, for use in, for example, filtration applications.

SUMMARY

Embodiments of the present disclosure meet the foregoing needs by providing a meltblown nonwoven including an ethylene/alpha-olefin interpolymer and a specific additive or combination of additives.

Disclosed herein is a meltblown nonwoven. The meltblown nonwoven is formed from a composition. The composition comprises an ethylene/alpha-olefin interpolymer having a density of from 0.911 to 0.939 g/cc, a Brookfield viscosity of less than or equal to 50,000 cP, and a molecular weight distribution ($M_{w,cc}/M_{n,cc}$) of 1.8 to 3.5; and an additive selected from the group consisting of a titanium dioxide, bis(2,2,6,6-tetramethyl-1-piperidinyloxy-4-yl) sebacate, talc, halloysite, organophilic phyllosilicate, or combinations thereof, and wherein the composition has a volume resistivity of greater than 7.0E+16 ohm·cm at room temperature.

Also disclosed herein is an air filter. The air filter comprises a meltblown nonwoven according to embodiments disclosed herein. In embodiments, the air filter comprises a meltblown nonwoven formed from a composition, the composition comprising an ethylene/alpha-olefin interpolymer having a density of from 0.911 to 0.939 g/cc, a Brookfield viscosity of less than or equal to 50,000 cP, and a molecular weight distribution ($M_{w,cc}/M_{n,cc}$) of 1.8 to 3.5; and an additive selected from the group consisting of a titanium dioxide, bis(2,2,6,6-tetramethyl-1-piperidinyloxy-4-yl) sebacate, talc, halloysite, organophilic phyllosilicate, or combinations thereof, and wherein the composition has a volume resistivity of greater than 7.0E+16 ohm·cm at room temperature.

These and other embodiments are described in more detail in the Detailed Description.

DETAILED DESCRIPTION

Aspects of the disclosed meltblown nonwovens are described in more detail below. The meltblown nonwovens can have a wide variety of applications and can be used to produce a wide variety of articles, including, for example, air filters, insulation, face masks, surgical gowns, bandages, and wound dressings. It is noted, however, that this is merely an illustrative implementation of the embodiments disclosed herein. The embodiments are applicable to other technologies that are susceptible to similar problems as those discussed above.

As used herein, the term "interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

A meltblown nonwoven is formed from a composition. The composition comprises an ethylene/alpha-olefin interpolymer and an additive.

Ethylene/Alpha-Olefin Interpolymer of Composition

In embodiments, the composition comprises, based on the total weight of the composition, from 90 to 99.95 weight percent (wt. %) of the ethylene/alpha-olefin interpolymer. All individual values and subranges of from 90 to 99.95 wt. % are disclosed and included herein. For example, the composition can comprise from 90 to 99.95 wt. %, from 92 to 99.95 wt. %, from 94 to 99.95 wt. %, from 96 to 99.95 wt. %, from 98 to 99.95 wt. %, or from 99 to 99.95 wt. % of the ethylene/alpha-olefin interpolymer, based on the total weight of the composition.

Ethylene/alpha-olefin interpolymer generally refers to polymers comprising ethylene and an alpha-olefin having 3 or more carbon atoms. In embodiments herein, the ethylene/alpha-olefin interpolymer comprises greater than 50 wt. % of the units derived from ethylene and less than 30 wt. % of the units derived from one or more alpha-olefin comonomers (based on the total amount of polymerizable monomers). All individual values and subranges of greater than 50 wt. % of the units derived from ethylene and less than 30 wt. % of the units derived from one or more alpha-olefin comonomers are included and disclosed herein. For example, in some embodiments, the ethylene/alpha-olefin interpolymer comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more a-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers typically have no more than 20 carbon atoms. The one or more alpha-olefins may be selected from the group consisting of C3-C20 acetylenically unsaturated monomers and C4-C18 diolefins. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene, or in the alternative, from the group consisting of 1-hexene and 1-octene. In some embodiments, the ethylene/alpha-olefin interpolymer comprises greater than 0 wt. % and less than 30 wt. % of units derived from one or more of 1-octene, 1-hexene, or 1-butene comonomers.

In embodiments described herein, the ethylene/alpha-olefin interpolymer has a density of 0.911 to 0.939 grams/cubic centimeter (g/cc). All individual values and subranges of from 0.911 to 0.939 g/cc are included and disclosed herein. For example, in some embodiments, the ethylene/alpha-olefin interpolymer has a density of 0.911 to 0.935 g/cc. In other embodiments, the ethylene/alpha-olefin interpolymer has a density of 0.913 to 0.939 g/cc. In further embodiments, the ethylene/alpha-olefin interpolymer has a density of 0.913 to 0.935 g/cc. Density may be measured according to ASTM D792.

In addition to the density, the ethylene/alpha-olefin interpolymer has a Brookfield viscosity of less than or equal to 50,000 centipoise (cP). All individual values and subranges of less than or equal to 50,000 cP are included and disclosed herein. For example, in some embodiments, the ethylene/alpha-olefin interpolymer has a Brookfield viscosity of less than or equal to 45,000 cP, less than or equal to 40,000 cP, or less than or equal to 35,000 cP. In other embodiments, ethylene/alpha-olefin interpolymer has a Brookfield viscosity of from 5,000 cP to 50,000 cP, from 5,000 cP to 45,000 cP, or 5,000 cP to 40,000 cP.

In addition to the density and Brookfield viscosity, the ethylene/alpha-olefin interpolymer has a molecular weight distribution ($M_{w,cc}/M_{n,cc}$) of from 1.8 to 3.5. Molecular weight distribution can be described as the ratio of weight-average molecular weight ($M_{w,cc}$) to number-average molecular weight ($M_{n,cc}$) (i.e., $M_{w,cc}/M_{n,cc}$), and can be measured by gel permeation chromatography (GPC) techniques. All individual values and subranges of from 1.8 to 3.5 are included and disclosed herein. For example, in some embodiments, the ethylene/alpha-olefin interpolymer has a molecular weight distribution ($M_{w,cc}/M_{n,cc}$) of from 1.9 to 3.5 or 2.0 to 3.5. In other embodiments, the ethylene/alpha-olefin interpolymer has a molecular weight distribution ($M_{w,cc}/M_{n,cc}$) of from 1.8 to 3.0, 1.9 to 3.0, or 2.0 to 3.0. In further embodiments, the ethylene/alpha-olefin interpolymer has a molecular weight distribution ($M_{w,cc}/M_{n,cc}$) of from 1.8 to 2.8, 1.9 to 2.8, or 2.0 to 2.8.

In addition to the density, Brookfield viscosity, and molecular weight distribution, the ethylene/alpha-olefin interpolymer may have an $M_{z,cc}/M_{n,cc}$ of less than 5.25. $M_{z,cc}$ can be described as the z average molecular weight. All individual values and subranges of less than 5.25 are included and disclosed herein. For example, in some embodiments, the ethylene/alpha-olefin interpolymer has a $M_{z,cc}/M_{n,cc}$ of less than 5.0, 4.5, 4.0, 3.8, or 3.5. In other embodiments, the ethylene/alpha-olefin interpolymer has a $M_{z,cc}/M_{n,cc}$ of from 2.5 to 5.25, 2.5 to 5.0, 2.5 to 4.5, 2.5 to 4.0, 2.5 to 3.8, or from 2.5 to 3.5.

In addition to the density, Brookfield viscosity, molecular weight distribution, and $M_{z,cc}/M_{n,cc}$, the ethylene/alpha-olefin interpolymer may have a weight fraction (w) of molecular weight greater than $10^5$ g/mole, based on the total weight of the ethylene/alpha-olefin interpolymer, as determined by conventional gel permeation chromatography, of less than 2.5%. All individual values and subranges of less than 2.5% are included and disclosed herein. For example, in some embodiments, the ethylene/alpha-olefin interpolymer has a weight fraction (w) of molecular weight greater than $10^5$ g/mole, based on the total weight of the ethylene/alpha-olefin interpolymer, as determined by conventional gel permeation chromatography, of less than 1.0%.

In addition to the density, Brookfield viscosity, molecular weight distribution, $M_{z,cc}/M_{n,cc}$, and weight fraction (w) of molecular weight greater than $10^5$ g/mole, the ethylene/alpha-olefin interpolymer may have a comonomer distribution breadth index (CDBI) of greater than or equal to 50%. All individual values and subranges of greater than or equal to 50% are included and disclosed herein. For example, in some embodiments, the ethylene/alpha-olefin interpolymer has a CDBI of greater than or equal to 55%, greater than or equal to 60%, greater than or equal to 65%, greater than or equal to 70%, or greater than or equal to 75%. In other embodiments, the ethylene/alpha-olefin interpolymer has a CDBI ranging from 50% to 98%, 50% to 97%, 55% to 98%, 55% to 97%, 60% to 98%, 60% to 97%, 70% to 98%, 70% to 97%, 75% to 98%, or 75% to 97%. In further embodiments, the ethylene/alpha-olefin interpolymer has a CDBI ranging from 50% to 85%, 55% to 85%, 60% to 85%, 60% to 80%, 65% to 80%, or 70% to 80%.

In addition to the density, Brookfield viscosity, molecular weight distribution, $M_{z,cc}/M_{n,cc}$, weight fraction (w) of molecular weight greater than $10^5$ g/mole, and CDBI, the ethylene/alpha-olefin interpolymer may have a highest DSC temperature crystallization peak, Tc, of from 80° C. to 110° C. All individual values and subranges of from 80° C. to 110° C. are included and disclosed herein. For example, in some embodiments, the ethylene/alpha-olefin interpolymer has a Tc of from 80° C. to 105° C., from 85° C. to 105° C., or from 90° C. to 105° C. In other embodiments, the ethylene/alpha-olefin interpolymer has a Tc of from 95° C. to 105° C. The highest DSC temperature crystallization peak is determined using the differential scanning calorimetry (DSC) method outlined below.

In addition to the density, Brookfield viscosity, molecular weight distribution, $M_{z,cc}/M_{n,cc}$, weight fraction (w) of molecular weight greater than $10^5$ g/mole, CDBI, and Tc, the ethylene/alpha-olefin interpolymer may have a temperature differential between the highest DSC temperature melting peak (Tm) and the highest DSC temperature crystallization peak (Tc), ΔTm−Tc, of less than 16° C. All individual values and subranges of less than 16° C. are included and disclosed herein. For example, in some embodiments, the ethylene/alpha-olefin interpolymer may have a ΔTm−Tc of less than 15° C. In other embodiments, the ethylene/alpha-olefin interpolymer may have a ΔTm−Tc of less than 12° C. The highest DSC temperature melting peak (Tm) is determined using the differential scanning calorimetry (DSC) method outlined below.

In embodiments herein, the ethylene/alpha-olefin interpolymer may be prepared in a solution polymerization process using one or more conventional reactors e.g. loop reactors, isothermal reactors, plug flow reactors, and/or stirred tank reactors in parallel, series, and/or any combinations thereof in continuous or batch mode to produce olefin based polymers, e.g. ethylene polymers or propylene polymers. The solution phase polymerization process may occur in one or more well-stirred reactors, such as one or more loop reactors or one or more isothermal reactors, at a temperature in the range of from 100 to 300° C.; for example, from 120 to 190° C., and at pressures in the range of from 300 to 1,000 psig; for example, from 400 to 750 psig. The residence time in solution phase polymerization process is typically in the range of from 2 to 30 minutes; for example, from 5 to 20 minutes. Ethylene (monomer), solvent, hydrogen, one or more catalyst systems, and one or more comonomers are fed continuously to the reactor. Exemplary solvents include, but are not limited to, isoparaffins and naphthinics. For example, such solvents are commercially available under the name ISOPAR E from ExxonMobil Chemical Co., Houston, Texas or under the name SBP 100/140 from Shell Chemicals Europe. The effluent from the polymerization reactor (containing solvent, monomer, comonomer, hydrogen, catalyst components, and molten polymer) exits the reactor and enters a zone where it is contacted with a deactivating agent and, optionally, an acid scavenging agent (such as calcium stearate and the accompanying water of hydration) to stop the reaction and scavenge hydrogen chloride. In addition, various additives, such as antioxidants, can be added at this point. The stream then goes through another set of static mixing elements, such as Kenics helical static mixing elements, to evenly disperse the catalyst kill and additives. The effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a multi-stage separation and devolatilization system where the polymer is removed from the solvent, hydrogen, and unreacted monomer and comonomer. Impurities are removed from the recycled, lower boiling reaction components before entering the reactor again. The separated and devolatilized polymer melt is pumped through a heat exchanger to lower the stream temperature to a temperature in the range of less than 200° C., for example less than 170° C., or in the range of from 50 to 110° C.; thereby producing a cooled polymer melt. Subsequently, the cooled polymer melt is pumped through a die specially designed for underwater pelletization, cut into uniform solid pellets, dried, and transferred into a hopper. After validation of initial polymer properties, the solid polymer pellets are transferred to storage devices. The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can also have some hydrogen which is then fortified with fresh hydrogen.

In some embodiments, the ethylene/alpha-olefin interpolymers may be prepared using a catalyst composition via a solution phase polymerization process in a loop reactor in accordance with the following procedure. All raw materials (ethylene, and one or more alpha-olefin comonomers, such as hexene or octene) and the process solvent (an isoparaffinic solvent, for example ISOPAR E) are purified with molecular sieves before introduction into the reaction environment. Hydrogen is supplied as a high purity grade and is not further purified. The reactor monomer feed (ethylene) stream is pressurized via a mechanical compressor to a pressure that is above the reaction pressure, e.g. 750 psig. The solvent and comonomer (one or more alpha-olefin comonomer, such as hexene or octene) feed is pressurized via a mechanical positive displacement pump to a pressure that is above the reaction pressure, e.g. 750 psig. The individual catalyst components can be manually batch diluted to specified component concentrations with purified solvent (ISOPAR E) and pressurized to a pressure that is above the reaction pressure, e.g. 750 psig. All reaction feed flows can be measured with mass flow meters and independently controlled with computer automated valve control systems.

The continuous solution polymerization reactor may consist of a liquid full, non-adiabatic, isothermal, circulating, loop. Independent control of all fresh solvent, monomer, comonomer, hydrogen, and catalyst component feeds is possible. The combined solvent, monomer, comonomer and hydrogen feed is temperature controlled to anywhere between 5° C. to 50° C. and typically 40° C. by passing the feed stream through a heat exchanger. The fresh comonomer feed to the polymerization reactor is aligned to add comonomer to the recycle solvent. The total fresh feed to the polymerization reactor is injected into the reactor at, for example, two locations roughly with equal reactor volumes between each injection location. The fresh feed is controlled typically with each injector, for example, receiving half of the total fresh feed mass flow. The catalyst components are injected into the polymerization reactor through, for example, a specially designed injection inlet device and are combined into one mixed procatalyst/cocatalyst feed stream prior to injection into the reactor. The procatalyst component feed is computer controlled to maintain the reactor monomer concentration at a specified target. The cocatalyst component is fed based on calculated specified molar ratios to the procatalyst component. Immediately following each fresh injection location (either feed or catalyst), the feed streams are mixed with the circulating polymerization reactor contents with static mixing elements, such as Kenics helical static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop can be provided by a screw pump. The effluent from the polymerization reactor (containing solvent, monomer, comonomer, hydrogen, catalyst components, and molten polymer) exits the reactor and enters a zone where it is contacted with a deactivating and, optionally, an acid scavenging agent (e.g., calcium stearate and the accompanying water of hydration) to stop the reaction and scavenge hydrogen chloride. In addition, various additives such as antioxidants can be added at this point. The stream then goes through another set of static mixing elements, such as Kenics helical static mixing elements to evenly disperse the catalyst kill and additives. The effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. Impurities are removed from the recycled low boiling reaction components before entering the reactor again. The separated and devolatilized polymer melt is pumped through a heat exchanger to lower the stream temperature to a temperature in the range of less than 200° C., for example less than 170° C., or in the range of from 50 to 110° C.; thereby producing a cooled polymer melt. Subsequently, the cooled polymer melt is pumped through a die specially designed for underwater pelletization, cut into uniform solid pellets, dried, and transferred into a hopper. After validation of initial polymer properties, the solid polymer pellets are transferred to storage devices. The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

In other embodiments, the ethylene/alpha-olefin interpolymer may be prepared using one or more catalyst systems suitable for polymerizing ethylene and one or more alpha-olefin comonomers via a solution phase polymerization process in two adiabatic stirred-tank reactors, linked together in series in accordance to the following procedure. The ethylene monomer and one or more alpha-olefin comonomers, and hydrogen are combined with a solvent, e.g. an isoparaffinic solvent, such as ISOPAR E. Impurities such as water, carbon dioxide, sulfurous compounds are removed from the feed streams, and the feed streams are cooled to temperature in the range of 5° C. to 60° C., for example, approximately 13° C., before entering the reactor. The majority, approximately from 85 to 90 percent, of the reaction may occur in the first adiabatic stirred-tank reactor. The mixing may be achieved via circulating the polymer/procatalyst/cocatalyst/solvent/ethylene/one or more alpha-olefin comonomers/hydrogen solution with one or more agitators equipped with mixing blades. The feed (ethylene/one or more alpha-olefin comonomers/solvent/hydrogen) may, for example, enter the reactor from the bottom and the procatalyst/cocatalyst may, for example, enter the reactor separately from the feed and also from the bottom. The first reactor temperature is in the range of from 120° C. to 190° C., for example, approximately 175° C., and the reactor pressure is in the range of from 400 psig to 1,000 psig, for example, approximately 500 psig. The temperature of the second reactor, in series with the first reactor, increases to a temperature in the range of from 175° C. to 210° C., for example, approximately 202° C. with approximately from 10 to 15 percent of the remaining reaction occurring and no additional catalyst or monomers are added. The average reactor residence time is in the range of from 2 to 30 minutes, for example, approximately 8 minutes per adiabatic stirred-tank reactor prior to termination post-reactor by a fluid specially designed for that purpose.

The effluent from the polymerization reactor (containing solvent, monomer, comonomer, hydrogen, catalyst components, and molten polymer) exits the reactor and enters a zone where it is contacted with a deactivating and optionally an acid scavenging agent (e.g., calcium stearate and the accompanying water of hydration) to stop the reaction and scavenge hydrogen chloride. In addition, various additives such as antioxidants can be added at this point. The stream then goes through another set of static mixing elements, such as Kenics helical static mixing elements to evenly disperse the catalyst kill and additives. The effluent (containing solvent, monomer, comonomer, hydrogen, catalyst components, and molten polymer) passes through a heat exchanger to raise the stream temperature in preparation for separation of the polymer from the other lower boiling reaction components. The stream then passes through a pressure let down control valve, which is responsible for maintaining the pressure of the reactor at a specified target. The stream then enters a two stage separation and devolatilization system where the polymer is removed from the solvent, hydrogen, and unreacted monomer and comonomer. Impurities are removed from the recycled lower boiling reaction components before entering the reactor again. The separated and devolatilized polymer melt is pumped through a heat exchanger to lower the stream temperature to a temperature in the range of less than 200° C., for example less than 170° C., or in the range of from 50 to 110° C.; thereby producing a cooled polymer melt. Subsequently, the cooled polymer melt is pumped through a die specially designed for underwater pelletization, cut into uniform solid pellets, dried, and transferred into a hopper. After validation of initial polymer properties, the solid polymer pellets are transferred to storage devices. The portions removed in the devolatilization step may be recycled or destroyed. For example, most of the solvent is recycled back to the reactor after passing through purification beds. This recycled solvent can still have unreacted co-monomer in it that is fortified with fresh co-monomer prior to re-entry to the reactor. This recycle solvent can still have some hydrogen which is then fortified with fresh hydrogen.

Additive(s) of Composition

The composition also comprises an additive or additives. The additive is selected from the group consisting of a titanium dioxide, bis(2,2,6,6-tetramethyl-1-piperidinyloxy-4-yl) sebacate, talc, halloysite, organophilic phyllosilicate, or combinations thereof. In embodiments, the additive is selected from a more limited group. For example, in embodiments, the additive is selected from the group consisting of bis(2,2,6,6-tetramethyl-1-piperidinyloxy-4-yl) sebacate, titanium dioxide, or combinations thereof. In further embodiments, the additive is bis(2,2,6,6-tetramethyl-1-piperidinyloxy-4-yl) sebacate.

In embodiments, the composition comprises from 0.05 to 10.00 wt. % of the additive, based on the total weight of the composition. All individual values and subranges of from 0.05 to 10.00 wt. % are disclosed and included herein. For example, the composition can comprise from a lower limit of 0.05 wt. %, 0.07 wt. %, 0.09 wt. %, 0.10 wt. %, 0.50 wt. %, 1.00 wt. %, 1.50 wt. %, 2.00 wt. %, 3.00 wt. %, 4.00 wt. %, 5.00 wt. %, to an upper limit of 10.00 wt. %, 9.00 wt. %, 8.00 wt. %, 7.00 wt. %, 6.00 wt. %, 5.00 wt. %, 4.00 wt. %, 3.00 wt. %, 2.00 wt. %, 1.00 wt. %, 0.50 wt. % of the additive, where weight percent is based on the total weight of the composition.

In embodiments, the additive melts during formation of the meltblown nonwoven, or is a solid having a median particle size (D50) of less than 1 micron. For example, in one embodiment, the additive is selected to be a combination of titanium dioxide, where titanium dioxide has a median particle size (D50) of less than 1 micron, and bis(2,2,6,6-tetramethyl-1-piperidinyloxy-4-yl) sebacate, where bis(2,2,6,6-tetramethyl-1-piperidinyloxy-4-yl) sebacate has a melt to liquid point of around 100° C. and melts during formation of a meltblown nonwoven (which requires temperatures greater than 100° C.). In embodiments where an additive is a solid after formation of the meltblown nonwoven, the additive can have a median particle size (D50) of less than 1 micron, less than 0.5 micron, or less than 0.25 micron. Without being bound by theory, a smaller particulate size (e.g., less than 1 micron) can decrease the possibility of fibers breaking and decrease the possibility of blocking the spinneret of the die during the formation of the meltblown nonwoven.

The composition can be formed by any suitable means known in the art, including, for example, dry blending or melt-blending. The additives may be untreated or treated with surface treatments (e.g., silane, stearate or surfactant surface treatments) before addition to the composition or treated in situ during manufacture of the composition. The specific additive(s) can be added to the ethylene/alpha-olefin interpolymer to improve volume resistivity of the composition, and the composition can have an improved volume resistivity, which makes it suitable for filtration applications. Without being bound by theory, the addition of the specific additive to the ethylene/alpha-olefin interpolymer during formation of the composition and meltblown nonwoven alters the morphology of the composition or meltblown nonwoven, increasing the composition's or meltblown nonwoven's volume resistivity and making them suitable for filtration applications.

In embodiments, the composition may have the following properties in accordance with the methods disclosed herein or similar methods, where volume resistivity is at room temperature. In certain embodiments, the composition has a volume resistivity of greater than 7.0E+16 ohm·cm at room temperature. All individual values and subranges of greater than 7.0E+16 ohm·cm are disclosed and included herein. For example, the composition can have a volume resistivity of greater than 7.0E+16 ohm·cm, greater than 8.0E+16 ohm·cm, greater than 9.0E+16 ohm·cm, greater than 1.0E+17 ohm·cm, greater than 2.0E+17 ohm·cm, greater than 3.0E+17 ohm·cm, greater than 4.0E+17 ohm·cm, or greater than 5.0E+17 ohm·cm, where volume resistivity at room temperature can be measured in accordance with the test method described below.

In certain embodiments, the composition has a volume resistivity of from greater than 7.0E+16 ohm·cm to 1.0E+19 ohm·cm, from greater than 7.0E+16 ohm·cm to 5.0E+18 ohm·cm, from greater than 7.0E+16 ohm·cm to 1.0E+18 ohm·cm, from greater than 1.0E+17 ohm·cm to 1.0E+19 ohm·cm, from greater than 1.0E+17 ohm·cm to 5.0E+18 ohm·cm, or from greater than 1.0E+17 ohm·cm to 1.0E+18 ohm·cm, where volume resistivity at room temperature can be measured in accordance with the test method described below.

Volume resistivity can also be measured at 60° C. in accordance with the test methods described below. In embodiments, the composition has a volume resistivity of greater than 5.0E+14 ohm·cm at 60° C. All individual values and subranges of greater than 5.0E+14 ohm·cm are disclosed and included herein. For example, the composition can have a volume resistivity of greater than 5.0E+14 ohm·cm, greater than 6.0E+14 ohm·cm, greater than 7.0E+14 ohm·cm, greater than 8.0E+14 ohm·cm, greater than 9.0E+14 ohm·cm, or greater than 1.0E+15 ohm·cm, where volume resistivity at 60° C. can be measured in accordance with the test method described below.

Meltblown Nonwoven

The composition may be used to form plaques, fibers, and/or nonwovens, such as meltblown nonwovens. As used herein, "meltblown" refers to fibers formed by extruding a molten thermoplastic polymer composition through a plurality of fine, usually circular, die capillaries as molten threads or filaments into converging high velocity gas streams (e.g. air) which function to attenuate the threads or filaments to reduced diameters. Thereafter, the filaments or threads are carried by the high velocity gas streams and deposited on a collecting surface to form a nonwoven web of randomly dispersed meltblown fibers with average diameters generally smaller than 10 micron. The terms "nonwoven," "nonwoven web," and "nonwoven fabric" are used herein interchangeably. "Nonwoven" refers to a web or fabric having a structure of individual fibers or threads which are randomly interlaid, but not in an identifiable manner as is the case for a knitted fabric.

In embodiments, a meltblown nonwoven formed from the composition may have the following properties in accordance with the methods disclosed herein or similar methods, where volume resistivity is at room temperature. In certain embodiments, a meltblown nonwoven formed from the composition has a volume resistivity of greater than 7.0E+16 ohm·cm. All individual values and subranges of greater than 7.0E+16 ohm·cm are disclosed and included herein. For example a meltblown nonwoven formed from the composition can have a volume resistivity of greater than 7.0E+16 ohm·cm, greater than 8.0E+16 ohm·cm, greater than 9.0E+16 ohm·cm, greater than 1.0E+17 ohm·cm, greater than 2.0E+17 ohm·cm, greater than 3.0E+17 ohm·cm, greater than 4.0E+17 ohm·cm, or greater than 5.0E+17 ohm·cm, where volume resistivity at room temperature can be measured in accordance with the test method described below.

In certain embodiments, a meltblown nonwoven formed from the composition has a volume resistivity of from greater than 7.0E+16 ohm·cm to 1.0E+19 ohm·cm, from greater than 7.0E+16 ohm·cm to 5.0E+18 ohm·cm, from greater than 7.0E+16 ohm·cm to 1.0E+18 ohm·cm, from greater than 1.0E+17 ohm·cm to 1.0E+19 ohm·cm, from greater than 1.0E+17 ohm·cm to 5.0E+18 ohm·cm, or greater than 1.0E+17 ohm·cm to 1.0E+18 ohm·cm, where volume resistivity at room temperature can be measured in accordance with the test method described below.

In embodiments, a meltblown nonwoven formed from the composition comprises fibers less having a diameter of less than 10 micron. All individual values and subranges of less than 10 micron are disclosed and included herein. For example, in embodiments, the meltblown nonwoven as described herein can comprise fibers having a diameter of less than 10 micron, less than 8 micron, less than 6 micron, less than 4 micron, less than 2 micron, or less than 1 micron, or can comprise fibers having a diameter in the range of from 0.1 micron to 10 micron, 0.1 to 8 micron, 0.1 to 6 micron, 0.1 to 4 micron, 0.1 to 2 micron, or 0.1 to 1 micron.

The meltblown nonwoven may be used in a composite structure. The composite structure may further comprise one or more spunbond nonwovens. As used herein, "spunbond" refers to fibers formed by extruding a molten thermoplastic polymer composition as filaments through a plurality of fine, usually circular, die capillaries of a spinneret with the diameter of the extruded filaments then being rapidly reduced and thereafter depositing the filaments onto a collecting surface to form a web or fabric of randomly dispersed spunbond fibers with average diameters generally between about 7 and about 30 micron. The spunbond fibers may be bicomponent or monocomponent fibers. The monocomponent fibers may comprise polyethylene. The bicomponent fibers may have a sheath/core structure where the sheath comprises polyethylene and the core comprises polypropylene. Of course, other configurations of bicomponent fibers may be used, such as, a side by side arrangement, a pie arrangement, or an "islands-in-the sea" arrangement.

In some embodiments, the composite has a $S_aM_bS_c$ configuration, wherein S is a spunbond nonwoven, M is the meltblown nonwoven formed from the composition as described herein, and a, b, and c are the number of layers, and are independent integers ranging from 1 to 5. For example, the composite may have a SMS (where a=1, b=1, and c=1), SMMS (where a=1, b=2, and c=1), SSMSS (where a=2, b=1, and c=2), SMMMS (where a=1, b=3, and c=1), SMMSS (where a=1, b=2, and c=2), or other configurations, as "a,", "b," and "c" are independent of each other.

Articles

Embodiments of the present invention also provide articles formed from the meltblown nonwoven described herein. Examples of such articles can include air filters, insulation, face masks, surgical gowns, bandages, and wound dressings. Articles of the present invention can be formed from the meltblown nonwoven disclosed herein using techniques known to those of skill in the art in view of the teachings herein.

Test Methods

Density

Density is measured in accordance with ASTM D-792, and expressed in grams/cubic centimeter (g/cc).

Brookfield Viscosity

Brookfield Viscosity is measured with a DV-II Pro Extra Viscometer. The instrument uses the Rheocalc V3.3 software which gives a great control and precision of the viscometer. 8 grams of sample is used when using the SC4-31 spindle size. Test temperature is 350° F. Adequate spindle speed is applied so that the torque is between 40% to 70% level. Viscosity data is recorded after 20 minutes when a stable viscosity reading is obtained.

Conventional GPC

Conventional GPC is obtained by high temperature gel permeation chromatography (GPC) equipment (PolymerChar, Spain). The IR5 detector ("measurement channel") is used as a concentration detector. GPCOne software (PolymerChar, Spain) is used to calculate the z-average (Mz), weight-average (Mw), and number-average (Mn) molecular weight of the polymer and to determine the MWD (=Mw/Mn). The method uses three 10 micron PL gel mixed B columns (Agilent Technologies, column dimension 100×7.6 mm) or four 20 micron PL gel mixed A columns (Agilent Technologies, column dimension 100×7.6 mm) operating at a system temperature of 150° C. Samples are prepared at a 2 mg/mL concentration in 1,2,4-trichlorobenzene solvent containing 200 part per million of antioxidant butylated hydroxytoluene (BHT) for 3 hours at 160° C. with a gentle shaking by autosampler (PolymerChar, Spain). The flow rate is 1.0 mL/min, the injection size is 200 microliters. GPCOne software is used to calculate the plate count. The chromatographic system must have a minimum of 22,000 plates.

The GPC column set is calibrated by running at least 20 narrow molecular weight distribution polystyrene standards. The calibration uses a third order fit for the system with three 10 micron PL gel mixed B columns or a fifth order fit for the system with four 20 micron PL gel mixed A columns. The molecular weight (MW) of the standards range from 580 g/mol to 8,400,000 g/mol, and the standards are contained in 6 "cocktail" mixtures. Each standard mixture has approximately a decade of separation between individual molecular weights. The standard mixtures are purchased from Agilent Technologies. The polystyrene standards are prepared at "0.025 g in 50 mL of solvent" for molecular weights equal to, or greater than, 1,000,000 g/mol, and at "0.05 g in 50 mL of solvent" for molecular weights less than 1,000,000 g/mol. The polystyrene standards are dissolved at 80° C., with gentle agitation, for 30 minutes. The narrow standards mixtures are run first, and in order of decreasing highest molecular weight component, to minimize degradation. The polystyrene standard peak molecular weights are converted to polyethylene molecular weights using Equation (1) (as described in Williams and Ward, J. Polym. Sci., Polym. Letters, 6, 621 (1968)):

$$MW_{PE} = A \times (MW_{PS})^B \tag{Eq. 1}$$

where MW is the molecular weight of polyethylene (PE) or polystyrene (PS) as marked, and B is equal to 1.0. It is known to those of ordinary skill in the art that A may be in a range of about 0.38 to about 0.44 such that the A value yields 52,000 $MW_{PE}$ for Standard Reference Materials (SRM) 1475a. Use of this polyethylene calibration method to obtain molecular weight values, such as the molecular weight distribution (MWD or Mw/Mn), and related statistics, is defined here as the modified method of Williams and Ward. The number-average molecular weight, the weight-average molecular weight, and the z-average molecular weight are calculated from the following equations.

$$M_{n,cc} = \Sigma w_i / \Sigma (w_i / M_{cc,i}) \tag{Eq. 2}$$

$$M_{w,cc} = \Sigma w_i M_{cc,i} \tag{Eq. 3}$$

$$M_{z,cc} = \Sigma (w_i M_{cc,i}^2) / \Sigma (w_i M_{cc,i}) \tag{Eq. 4}$$

where $M_{n,cc}$, $M_{w,cc}$, and $M_{z,cc}$ (in g/mole) are the number-, weight-, and z-average molecular weight obtained from the conventional calibration, respectively. $w_i$ is the weight fraction of the polyethylene molecules eluted at retention volume $V_i$. $M_{cc,i}$ is the molecular weight (in g/mole) of the polyethylene molecules eluted at retention volume $V_i$ obtained using the conventional calibration (see Equation (1)).

The chromatographic peaks should be set to include area marking a significant visible departure from baseline when the chromatogram is viewed at 20 percent peak height. The baseline should not be integrated to less than 100 polyethylene-equivalent molecular weight and care must be used to account for anti-oxidant mismatch from the prepared sample and the chromatographic mobile phase. Referring to FIG. 1, depicted is the proper baseline and integration limit sets for a sample that exhibits a clear separate anti-oxidant peak.

Use of a decane flow rate marker can be shown in the IR5 chromatogram. At no point should the baseline (response) Y-value difference between the start and the end of the baseline be greater than 3 percent of the integrated peak height of the chromatogram. In such a case, the chromatographic sample must be handled through proper matching of the sample and mobile phase antioxidant. A proper baseline and integration limits sets for a sample shows continuity towards 100 polyethylene-equivalent molecular weight. At no point should the end integration limit be set lower than 100 polyethylene-equivalent molecular weight.

w (wt. fraction greater than $10^5$ g/mole) is calculated according the MWD curve (wi versus log Mcc, i) obtained from GPCOne software according to Equation (5)

$$w = \int_{logM_{cc,i}=5}^{logM_{cc,i}=7} w_i d\log M_{cc,i} \bigg/ \int_{logM_{cc,i}=2}^{logM_{cc,i}=7} w_i d\log M_{cc,i} \quad \text{(Eq. 5)}$$

Differential Scanning Calorimetry (DSC)

DSC was used to measure the melting and crystallization behavior of a polymer over a wide range of temperatures. For example, the TA Instruments Q1000 DSC, equipped with an RCS (refrigerated cooling system) and an autosampler was used to perform this analysis. During testing, a nitrogen purge gas flow of 50 ml/min was used. Each sample was melt pressed into a thin film at about 175° C.; the melted sample was then air-cooled to room temperature (approx. 25° C.). The film sample was formed by pressing a "0.1 to 0.2 gram" sample at 175° C. at 1,500 psi, and 30 seconds, to form a "0.1 to 0.2 mil thick" film. A 3-10 mg, 6 mm diameter specimen was extracted from the cooled polymer, weighed, placed in a light aluminum pan (ca 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves were recorded. The cool curve was analyzed by setting baseline endpoints from the beginning of crystallization to −20° C. The heat curve was analyzed by setting baseline endpoints from −20° C. to the end of melt. The values determined were highest peak melting temperature ($T_m$), highest peak crystallization temperature ($T_c$), heat of fusion ($H_f$) (in Joules per gram), and the calculated % crystallinity for polyethylene samples using: % Crystallinity=(($H_f$)/(292 J/g))×100. The heat of fusion ($H_f$) and the highest peak melting temperature were reported from the second heat curve. The highest peak crystallization temperature is determined from the cooling curve.

Crystallization Elution Fractionation (CEF) Method

Comonomer distribution analysis, also commonly called short chain branching distribution (SCBD), is measured with Crystallization Elution Fractionation (CEF) (PolymerChar, Spain) (Monrabal et al, Macromol. Symp. 257, 71-79 (2007), which is incorporated herein by reference) equipped with IR-4 detector (PolymerChar, Spain) and two angle light scattering detector Model 2040 (Precision Detectors, currently Agilent Technologies). IR-4 or IR-5 detector is used. A 10 or 20 micron guard column of 50×4.6 mm (PolymerLab, currently Agilent Technologies) is installed just before the IR-4 detector or IR-5 detector in the detector oven. Ortho-dichlorobenzene (ODCB, 99% anhydrous grade) and 2,5-di-tert-butyl-4-methylphenol ("BHT", catalogue number B1378-500G, batch number 098K0686) from Sigma-Aldrich are obtained. ODCB is distilled before use. Silica gel 40 (particle size 0.2-0.5 mm, catalogue number 10181-3) from EMD Chemicals is also obtained. The silica gel is dried in a vacuum oven at 160° C. for about two hours before use. Eight hundred milligrams of BHT and five grams of the silica gel are added to two liters of ODCB. ODCB can be also dried by passing through a column or columns packed with silica gel. For the CEF instrument equipped with an autosampler with N2 purging capability, Silica gel 40 is packed into two 300×7.5 mm GPC size stainless steel columns and the Silica gel 40 columns are installed at the inlet of the pump of the CEF instrument to dry ODCB; and no BHT is added to the mobile phase. This "ODCB containing BHT and silica gel" or ODCB dried with silica gel 40 is now referred to as "ODCB." This ODCB is sparged with dried nitrogen (N2) for one hour before use. Dried nitrogen is such that is obtained by passing nitrogen at <90 psig over $CaCO_3$ and 5 Å molecular sieves. The resulting nitrogen should have a dew point of approximately −73° C. Sample preparation is done with autosampler at 4 mg/ml (unless otherwise specified) under shaking at 160° C. for 2 hours. The injection volume is 300 µl. The temperature profile of CEF is: crystallization at 3° C./min from 110° C. to 30° C., the thermal equilibrium at 30° C. for 5 minutes (including Soluble Fraction Elution Time being set as 2 minutes), elution at 3° C./min from 30° C. to 140° C. The flow rate during crystallization is 0.052 ml/min. The flow rate during cooling step is 0.052 mL/min. The flow rate during elution is 0.50 ml/min. The data is collected at one data point/second. The CEF column is packed with glass beads at 125 µm±6% (MO-SCI Specialty Products) with ⅛ inch stainless tubing according to U.S. Pat. No. 8,372,931, which is incorporated herein by reference. The column outside diameter (OD) is ⅛ inch. The critical parameters needed to duplicate the method include the column internal diameter (ID), and column length (L). The choice of ID and L must be such that when packed with the 125 µm diameter glass beads, the liquid internal volume is 2.1 to 2.3 mL. If L is 152 cm, then ID must be 0.206 cm and the wall thickness must be 0.056 cm. Different values for L and ID can be used, as long as the glass bead diameter is 125 µm and the internal liquid volume is between 2.1 and 2.3 mL. Column temperature calibration is performed by using a mixture of NIST Standard Reference Material Linear polyethylene 1475a (1.0 mg/ml) and Eicosane (2 mg/ml) in ODCB. CEF temperature calibration consists of four steps: (1) Calculating the delay volume defined as the temperature offset between the measured peak elution temperature of Eicosane minus 30.00° C.; (2) Subtracting the temperature offset of the elution temperature from CEF raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that NIST linear polyethylene 1475a has a peak temperature at 101.0° C., and Eicosane has a peak temperature of 30.0° C.; (4) For the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931, which is incorporated herein by reference. CEF data is processed by GPCOne software (PolymerChar, Spain).

Volume Resistivity

Volume resistivity is determined by the following method which is based on ASTM D257. The volume resistivity is determined using a Keithley 6517 B electrometer, combined with the Keithley 8009 test fixture. The Keithley model 8009 test chamber is located inside the forced air oven which is capable of operating at elevated temperatures (maximum temperature 80° C.). The leakage current is recorded from the instrument via software and the following equation (Equation 6) is used to calculate the volume resistivity (VR):

$$\rho = \frac{V \times A}{I \times t} \quad \text{(EQ. 6)}$$

wherein $\rho$ is the volume resistivity in ohm·cm, V is the applied voltage in volts, A is the electrode contact area in $cm^2$, I is the leakage current in amps recorded after 10 minutes of applied voltage, and t is the thickness of the sample. The thickness of the compression molded plaque is measured before the test. Five points of the plaque are measured to get the average thickness, which is used in the calculation. The test is conducted at 1000 volts at room temperature, where room temperature is from 20° C. to 25° C., and is conducted at 1000 volts at 60° C., where a Keithley model 8009 test chamber is first stabilized at 60° C. for 1 hour before VR measurement. For both room temperature and at 60° C., two compression molded plaques are tested and the recorded VR is the average of the two tests. Results are reported in ohm-centimeters (ohm·cm).

EXAMPLES

The following examples illustrate features of the present disclosure but are not intended to limit the scope of the disclosure.

Materials

The following materials are included in the examples.

An experimental fiber resin (hereinafter "Poly. 1") is used as the ethylene/alpha-olefin interpolymer of the composition for the examples. Poly. 1 corresponds to the "Inv. 4" of PCT Publication WO 2018/169738, which is incorporated herein in its entirety by reference. Poly. 1 has the properties as provided in PCT Publication WO 2018/169738, including those provided in Table 1.

TABLE 1

| Poly. 1 Ethylene/alpha-olefin interpolymer | |
|---|---|
| Polymer Density (g/cc) | 0.930 |
| Brookfield Viscosity (cP) | 32,544 |
| $M_{n, cc}$ | 10,124 |
| $M_{w, cc}$ | 22,644 |
| $M_{z, cc}$ | 37,500 |
| $M_{w, cc}/M_{n, cc}$ | 2.2 |
| $M_{z, cc}/M_{n, cc}$ | 3.7 |

TABLE 1-continued

| Poly. 1 Ethylene/alpha-olefin interpolymer | |
|---|---|
| w (wt. fraction greater than $10^5$ g/mole) | 0.53% |
| Tm (° C.) | 114.2 |
| Tc (° C.) | 103.3 |
| ΔTm – Tc | 10.9 |
| CDBI (%) | 78.9 |

Ti-Pure™ R-104, titanium dioxide, having a median particle size (D50) of 0.24 micron, and commercially available from The Chemours Company (Wilmington, DE).

Bis-TEMPO, bis (2,2,6,6-tetramethyl-1-piperidinyloxy-4-yl) sebacate, having a melt to liquid temperature of about 100 degrees Celsius and commercially available from Sugian Unitech Co., Ltd. (Jiangsu, P.R. China). The temperature for the formation of meltblown nonwovens exceeds 180 degrees Celsius, and so bis (2,2,6,6-tetramethyl-1-piperidinyloxy-4-yl) sebacate turns to liquid during formation of a meltblown nonwoven.

SD-900, talc, having a median particle size (D50) of 2.6 micron and commercially available from Liaoning Xinda Talc Group (P.R. China).

DRAGONITE™ HP, halloysite, having a median particle size (D50) of about 50 nanometers and commercially available from Applied Minerals Inc. (New York, NY).

Cloisite 20A, organophilic phyllosilicate, having a median particle size (D50) of about 10 micron and commercially available from BYK (Germany)

Barium titanate, having a median particle size (D50) of about less than 100 nanometers and commercially available from Sinopharm Chemical Reagent Co. Ltd. (Shanghai, P.R. China).

Magnesium stearate, having a melt to liquid temperature of about 150 degrees Celsius, and commercially available from Sinopharm Chemical Reagent Co. Ltd. (Shanghai, P.R. China). The temperature for the formation of meltblown nonwovens exceeds 180 degrees Celsius, and so magnesium stearate turns to liquid during formation of a meltblown nonwoven.

Calcium stearate, having a melt to liquid temperature of about 150 degrees Celsius, and commercially available from Sinopharm Chemical Reagent Co. Ltd. (Shanghai, P.R. China). The temperature for the formation of meltblown nonwovens exceeds 180 degrees Celsius, and so calcium stearate turns to liquid during formation of a meltblown nonwoven.

Sample Preparation

Poly. 1 is fed into a Brabender mixer at a set temperature of 120 degrees Celsius with a rotor speed of 30 rpm. The resin is heated and melted, and then any additive(s) (per the concentration in the below tables) is added into the mixer. Mixing is continued at 50 rpm for seven minutes to disperse any additive(s). The composition is collected and pressed into a thin plaque in a 160*160*1.0 mm mold. The thin plaque is preheated at 150 degrees Celsius for 5 minutes and then degassed, followed by another 3 minute pressing process at 150 degrees Celsius. The volume resistivity (VR) of the plaque is then tested in accordance with the test method described above.

Meltblown nonwovens are formed using the same composition as used to form the plaques. Additive masterbatch pellets are dry blended with the ethylene/alpha-olefin interpolymer pellets and fed into a meltblown line extruder. 25 gsm meltblown nonwovens are fabricated on a conventional meltblown line via air jet spinning that attenuates the fibers to a fiber diameter of less than 10 micron. Examples of conventional meltblown lines include but are not limited to RF4/RF5 Single row meltblown line (manufactured by Reicofil) and biax meltblown line (manufactured by Biax-Fiberfilm Corporation).

Table 2 below shows the concentration of Poly. 1 and any additives, along with the VR measurements at room temperature ("@RT") and at 60° C. ("@60° C."), for the Inventive and Comparative Examples, which are based on the plaques formed as described above.

As seen in the Inventive Examples (IE1 to IE8), the compositions of the present disclosure surprisingly and unexpectedly show an increase in the VR by a significant amount (e.g., in some cases as much as an order of magnitude). In contrast, as seen in comparative examples (CE1 to CE4), addition of no additive or certain other additives does not increase the VR. Without being bound by any theories, the results surprisingly demonstrate a synergistic effect of the components in the Inventive Examples to improve VR.

TABLE 2

| Example | Poly. 1 | Additive(s) | VR@RT (ohm · cm) | VR@60° C. (ohm · cm) |
|---|---|---|---|---|
| CE 1 | 100.00 wt. % | No Additive | 4.75E+16 | 1.48E+14 |
| CE 2 | 99.60 wt. % | 0.40 wt. % Magnesium Stearate | 3.08E+16 | 1.60E+14 |
| CE 3 | 99.60 wt. % | 0.40 wt. % Calcium Stearate | 4.77E+16 | 2.24E+14 |
| CE 4 | 99.60 wt. % | 0.40 wt. % Barium Titanate | 5.20E+16 | 2.19E+14 |
| IE 1 | 95.00 wt. % | 5.00 wt. % SD-900 (talc) | 1.90E+17 | 5.42E+15 |
| IE 2 | 95.00 wt. % | 5.00 wt. % DRAGONITE™ HP (halloysite) | 4.12E+17 | 8.71E+15 |
| IE 3 | 98.00 wt. % | 2.00 wt. % Cloisite 20A (organophilic phyllosilicate) | 5.22E+17 | 1.08E+16 |
| IE 4 | 98.80 wt. % | 1.20 wt. % Bis-TEMPO* | 5.49E+17 | 9.43E+15 |
| IE 5 | 99.60 wt. % | 0.40 wt. % Bis-TEMPO* | 5.45E+17 | 1.29E+15 |
| IE 6 | 99.90 wt. % | 0.10 wt. % Bis-TEMPO* | 1.36E+17 | NM** |
| IE 7 | 95.00 wt. % | 5.00 wt. % Ti-Pure™ R-104 (titanium dioxide) | 2.34E+17 | 1.31E+15 |
| IE 8 | 97.9 wt. % | 0.10 wt. % Bis-TEMPO* AND 2.00 wt. % Ti-Pure™ R-104 (titanium dioxide) | 3.56E+17 | 1.04E+15 |

*bis (2,2,6,6-tetramethyl-1-piperidinyloxy-4-yl) sebacate
**NM = not measured

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A meltblown nonwoven formed from a composition comprising:
    an ethylene/alpha-olefin interpolymer having
        a density of from 0.911 to 0.939 g/cc,
        a Brookfield viscosity of less than or equal to 50,000 cP, and
        a molecular weight distribution ($M_{w,cc}/M_{n,cc}$) of 1.8 to 3.5; and
    an additive selected from halloysite;
    wherein the composition has a volume resistivity of greater than 7.0E+16 ohm·cm at room temperature.

2. The meltblown nonwoven of claim 1, wherein the composition comprises, based on the total weight of the composition, from 90 to 99.95 wt. % of the ethylene/alpha-olefin interpolymer and from 0.05 to 10.00 wt. % of the additive.

3. The meltblown nonwoven of claim 1, wherein the additive melts to liquid during formation of the meltblown nonwoven, or is a solid having a median particle size (D50) of less than 1 micron.

4. The meltblown nonwoven of claim 1, wherein the ethylene/alpha-olefin interpolymer has an $M_{z,cc}/M_{n,cc}$ less than 5.25.

5. The meltblown nonwoven of claim 1, wherein the ethylene/alpha-olefin interpolymer has a weight fraction (w) of molecular weight greater than $10^5$ g/mole, based on the total weight of interpolymer, as determined by conventional gel permeation chromatography, of less than 2.5%.

6. A meltblown nonwoven formed from a composition comprising:
    an ethylene/alpha-olefin interpolymer having
        a density of from 0.911 to 0.939 g/cc,
        a Brookfield viscosity of less than or equal to 50,000 cP, and
        a molecular weight distribution ($M_{w,cc}/M_{n,cc}$) of 1.8 to 3.5; and
    an additive that is bis(2,2,6,6-tetramethyl-1-piperidinyloxy-4-yl) sebacate.

7. The meltblown nonwoven of claim 1, wherein the meltblown nonwoven comprises fibers having a diameter of less than 10 micron.

8. The meltblown nonwoven of claim 1, wherein the composition has a volume resistivity of greater than 5.0E+14 ohm·cm at 60° C.

9. An air filter comprising the meltblown nonwoven of claim 1.

10. A meltblown nonwoven formed from a composition comprising:

an ethylene/alpha-olefin interpolymer having
a density of from 0.911 to 0.939 g/cc,
a Brookfield viscosity of less than or equal to 50,000 cP, and
a molecular weight distribution ($M_{w,cc}/M_{n,cc}$) of 1.8 to 3.5; and
an additive that is organophilic phyllosilicate; and
wherein the composition has a volume resistivity of greater than 7.0E+16 ohm·cm at room temperature.

11. A meltblown nonwoven formed from a composition comprising:
an ethylene/alpha-olefin interpolymer having
a density of from 0.911 to 0.939 g/cc,
a Brookfield viscosity of less than or equal to 50,000 cP, and
a molecular weight distribution ($M_{w,cc}/M_{n,cc}$) of 1.8 to 3.5; and
an additive that is a blend titanium dioxide and bis(2,2,6,6-tetramethyl-1-piperidinyloxy-4-yl) sebacate; and
wherein the composition has a volume resistivity of greater than 7.0E+16 ohm·cm at room temperature.

* * * * *